No. 624,713. Patented May 9, 1899.
D. WARNER.
MUD GUARD FOR VEHICLES.
(Application filed Dec. 16, 1898.)
(No Model.) 2 Sheets—Sheet 1.
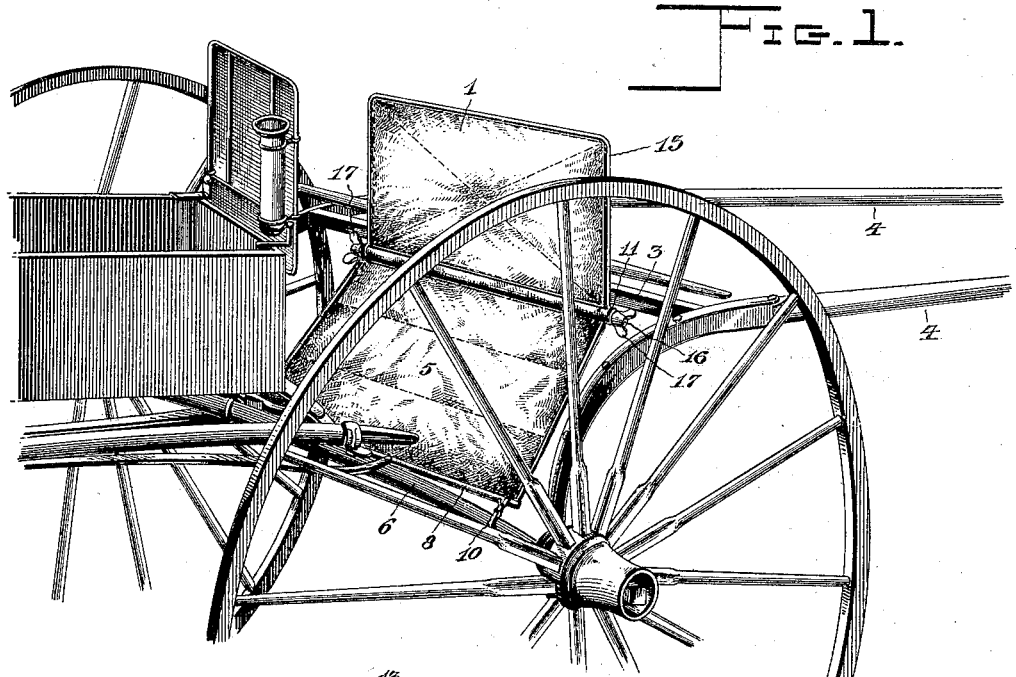
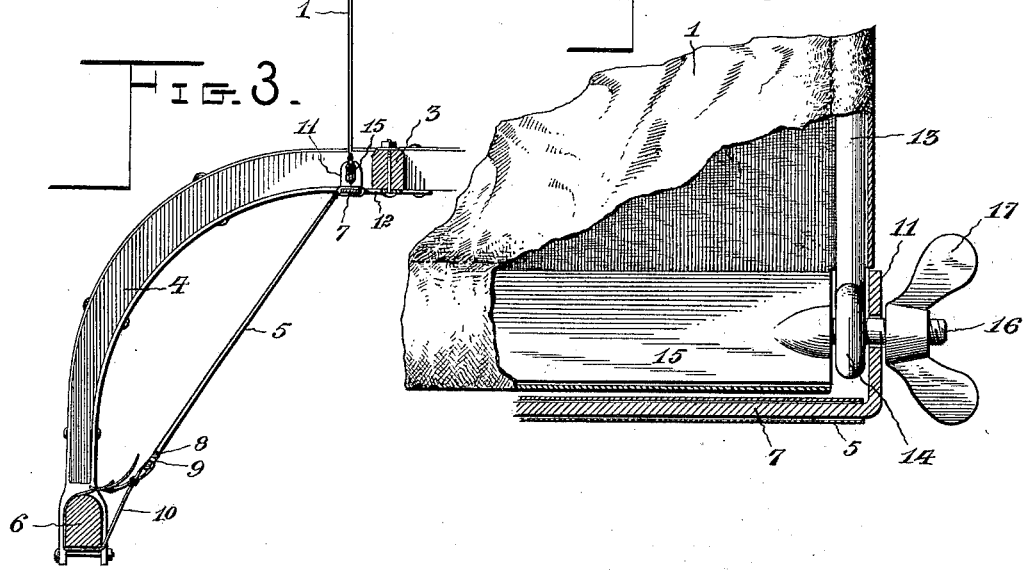
Witnesses  Daniel Warner, Inventor
By his Attorneys, No. 624,713. Patented May 9, 1899.
D. WARNER.
MUD GUARD FOR VEHICLES.
(Application filed Dec. 16, 1898.)
(No Model.) 2 Sheets—Sheet 2.
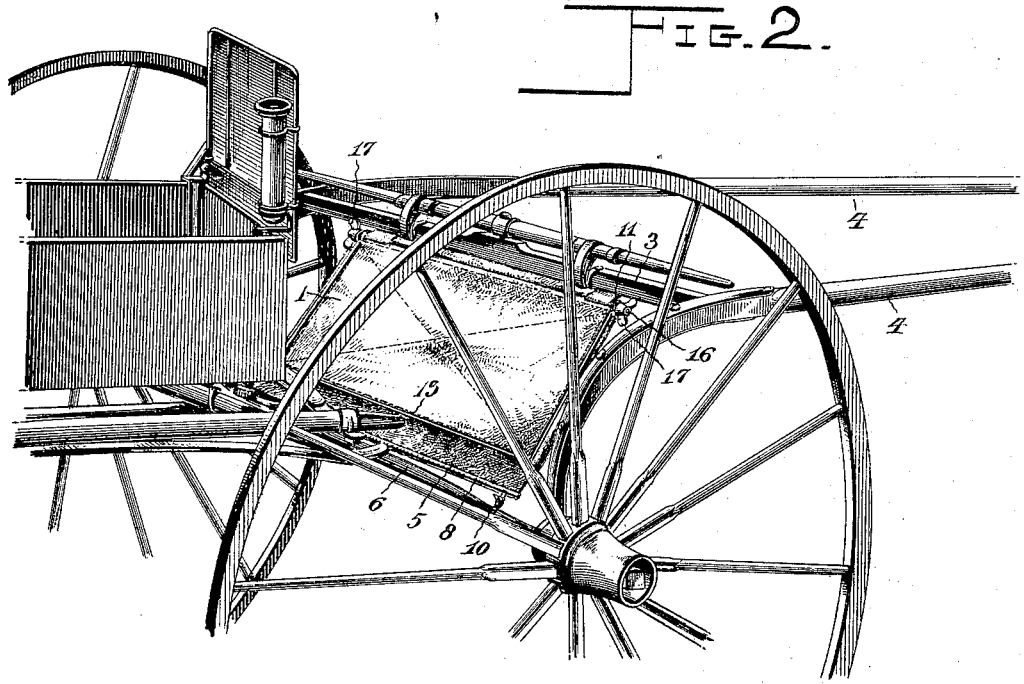
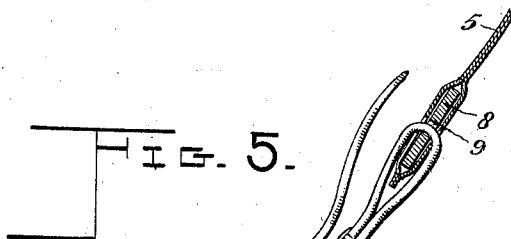
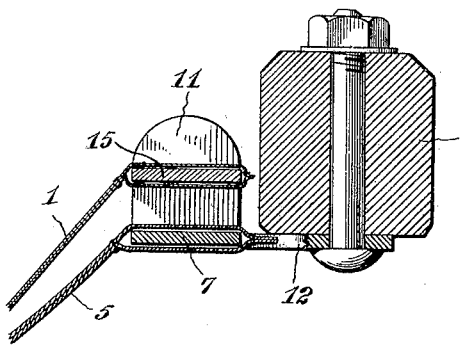
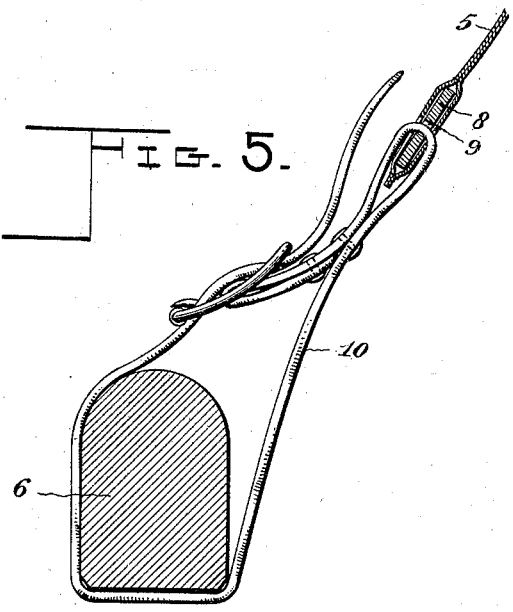
Witnesses
Daniel Warner, Inventor
By his Attorneys,

UNITED STATES PATENT OFFICE.

DANIEL WARNER, OF BRONSON, MICHIGAN.

MUD-GUARD FOR VEHICLES.

SPECIFICATION forming part of Letters Patent No. 624,713, dated May 9, 1899.

Application filed December 16, 1898. Serial No. 699,486. (No model.)

*To all whom it may concern:*

Be it known that I, DANIEL WARNER, a citizen of the United States, residing at Bronson, in the county of Branch and State of Michigan, have invented a new and useful Mud-Guard for Vehicles, of which the following is a specification.

The invention relates to improvements in mud-guards for vehicles.

The object of the present invention is to improve the construction of mud-guards for vehicles and to provide a simple, inexpensive, and efficient one adapted to be readily applied to a wheeled vehicle or a sleigh and capable of enabling the same to be driven at a high rate of speed without liability of splashing the occupant with mud, snow, dirt, or the like.

The invention consists in the construction and novel combination and arrangement of parts hereinafter fully described, illustrated in the accompanying drawings, and pointed out in the claims hereto appended.

In the drawings, Figure 1 is a perspective view of a mud-guard constructed in accordance with this invention and shown applied to a vehicle, the supplemental dash being raised. Fig. 2 is a similar view, the supplemental dashboard being folded. Fig. 3 is a longitudinal sectional view, the parts being arranged as shown in Fig. 1. Figs. 4 and 5 are enlarged detail sectional views illustrating the manner of attaching the device to the cross-bar of a pair of thills and to the front axle. Fig. 6 is a similar view illustrating the manner of securing the supplemental dashboard at the desired adjustment.

Like numerals of reference designate corresponding parts in all the figures of the drawings.

1 designates a supplemental dashboard arranged adjacent to and extending upward from the cross-bar 3 of a pair of thills 4, and a flexible apron 5 extends downward and rearward from the cross-bar 3 to the front axle 6, the apron and the supplemental dashboard forming a mud-guard to prevent the occupants of a vehicle from being splashed with mud, snow, and the like while driving at a high rate of speed. The apron 5, which is constructed of oil-cloth or other suitable material, is provided at its front and rear edges with transverse bars 7 and 8, arranged in hems or casings and adapted to support the apron. The rear transverse bar 8 reinforces the apron and is provided with slots registering with slots 9 of the apron to receive straps 10 for securing the rear edge of the said apron to the front axle. The straps are located adjacent to the side edges of the apron and are adapted to encircle the front axle and are provided with buckles and perforations, as shown. The front transverse bar 7, which is arranged at the front end of the apron, has its ends upturned to forms arms 11, and it is provided at points between its ends with forwardly-projecting perforated ears 12, extending beneath the cross-bar 3 and secured to the lower face thereof by suitable fastening devices.

The supplemental dashboard which is hinged to the front of the flexible curtain is constructed of oil-cloth or other suitable material arranged on a rectangular frame 13, having its top and sides preferably formed integral with each other, and the lower terminals of the sides are provided with eyes 14, through which pass the reduced ends of the bottom bar 15 of the frame 13. The terminals 16 of the bar 15 form pivots for the supplemental dashboard and are threaded for the reception of winged nuts 17, which are arranged at the outer faces of the arms 11, and by tightening the nuts the sides of the frame 13 are securely clamped between the arms 11 and the shoulders formed by reducing the ends of the bar 15. By this construction the supplemental dashboard may be arranged in a vertical position, as illustrated in Fig. 1 of the accompanying drawings, or it may be folded downward and rearward upon the rear face of the upper portion of the apron, as shown in Fig. 2, or it can be arranged at any intermediate point. The frame 13, which is oblong, is concealed within suitable hems or casings formed at the top, bottom, and side edges of the supplemental dashboard.

The invention has the following advantages: The mud-guard, which is simple, inexpensive, strong, and durable, is adapted to be readily mounted on a vehicle or a sleigh, and it will not interfere with the whiffletree or the movements of the front axle. The supplemental dashboard, which is arranged in a vertical position at the rear edge of the cross-bar of the shafts, is located a sufficient distance in advance of the body of the buggy to prevent effectually any mud, slush, or the like from striking the occupants even when driving at a very high rate of speed. The flexible apron, which extends downward and rearward from the lower edge of the supplemental dashboard to the rear axle, protects the front of the vehicle, and the mud-guard may be readily removed from the vehicle when desired. The supplemental dashboard may be quickly adjusted and arranged either in a vertical position to form a shield or in a folded position to arrange it out of the way. The nuts at the hinged edge of the supplemental dashboard secure the same at any desired adjustment and enable the position of the dashboard to be quickly changed when desired. The mud-guard by being arranged in the position shown is not only most effective, but it does not interfere in the least with the occupants entering or leaving a vehicle and it does not consume any of the space within the body of the vehicle or obstruct the view.

Changes in the form, proportion, and minor details of construction may be resorted to without departing from the spirit or sacrificing any of the advantages of this invention.

What is claimed is—

1. A device of the class described comprising a folding dashboard located in advance of the body of a vehicle, and a flexible apron extending rearward from the bottom of the dashboard, substantially as and for the purpose described.

2. A device of the class described comprising a folding supplemental dashboard designed to be arranged in a vertical position in advance of the body of the vehicle, said dashboard being hinged at its bottom and adapted to swing downward, and a flexible apron extending rearward from the bottom of the supplemental dashboard and connected with the running-gear, substantially as described.

3. A device of the class described comprising a flexible apron provided at its front edge with means for securing it to the cross-bar of a pair of thills and having fastening devices at its rear edge for attaching it to the front axle, a supplemental dashboard hinged to the front edge of the apron and adapted to swing rearward and fold against the same, and means for securing the supplemental dashboard at the desired adjustment, substantially as described.

4. A device of the class described comprising a flexible apron provided at its rear edge with means for attaching it to the front axle of a vehicle and having a transverse bar at its front edge, said bar being provided at its ends with arms and being adapted to be secured to the cross-bar of a pair of thills, a supplemental dashboard having a frame composed of rigid top and sides, the latter being provided at their lower ends with eyes, a transverse bar arranged at the bottom of the supplemental dashboard and provided with reduced ends, forming pivots and passing through said eyes and the said arms and threaded beyond the latter, and nuts arranged on the threaded portions of the reduced ends, substantially as described.

In testimony that I claim the foregoing as my own I have hereto affixed my signature in the presence of two witnesses.

DANIEL WARNER.

Witnesses:
W. R. McCANN,
NORA L. RYAN.